US006722191B2

(12) United States Patent
Koch et al.

(10) Patent No.: US 6,722,191 B2
(45) Date of Patent: Apr. 20, 2004

(54) NON-ATTACHED MONITORING ASSEMBLY FOR PNEUMATIC TIRE

(75) Inventors: Russell W. Koch, Hartville, OH (US); Paul B. Wilson, Tallmadge, OH (US); Jack Dutcher, Mesa, AZ (US); Guy J. Walenga, Mt. Juliet, TN (US); John D. Rensel, Tallmadge, OH (US)

(73) Assignee: Bridgestone/Firestone North American Tire, LLC, Nashville, TX (US)

( * ) Notice: Subject to any disclaimer, the term of this patent is extended or adjusted under 35 U.S.C. 154(b) by 0 days.

(21) Appl. No.: 10/302,586

(22) Filed: Nov. 21, 2002

(65) Prior Publication Data

US 2003/0150261 A1 Aug. 14, 2003

Related U.S. Application Data

(63) Continuation-in-part of application No. 09/943,916, filed on Aug. 31, 2001, now Pat. No. 6,543,277, which is a continuation-in-part of application No. 09/608,425, filed on Jun. 30, 2000, now Pat. No. 6,360,594, which is a continuation-in-part of application No. 09/191,671, filed on Nov. 13, 1998, now Pat. No. 6,082,192.

(51) Int. Cl.$^7$ ............................................. G01M 12/02
(52) U.S. Cl. .................... 73/146; 73/146.2; 152/152.1; 152/415; 156/123
(58) Field of Search ............................. 73/146, 146.2; 152/152.1, 415; 156/123

(56) References Cited

U.S. PATENT DOCUMENTS 5,500,065 A * 3/1996 Koch et al. .................. 156/123
6,161,430 A * 12/2000 Koch et al. .................. 73/146

\* cited by examiner

*Primary Examiner*—Edward Lefkowitz
*Assistant Examiner*—Alandra Ellington
(74) *Attorney, Agent, or Firm*—Fred H. Zollinger, III; Michael R. Huber (57) ABSTRACT

A monitoring assembly for a pneumatic tire is designed to be loosely disposed within the tire and rim combination. The monitoring assembly includes a protective body that surrounds a monitoring device. The protective body at least includes a rigid encapsulation material and may include a cushion layer disposed outside the rigid encapsulation layer. One embodiment of the invention provides channels disposed through the protective body to speed the temperature response of the monitoring assembly.

19 Claims, 9 Drawing Sheets

NON-ATTACHED MONITORING ASSEMBLY FOR PNEUMATIC TIRE

CROSS REFERENCE TO RELATED APPLICATIONS

This application is a continuation-in-part of currently-pending U.S. patent application Ser. No. 09/943,916 filed Aug. 31, 2001 now U.S. Pat. No. 6,543,277 which is a continuation-in-part of currently-pending U.S. patent application Ser. No. 09/608,425 filed Jun. 30, 2000 now U.S. Pat. No. 6,360,594, which was a continuation-in-part application of Ser. No. 09/191,671 filed on Nov. 13, 1998 now U.S. Pat. No. 6,082,192 dated Jul. 4, 2000; the disclosures of all are incorporated herein by reference.

BACKGROUND OF THE INVENTION

1. Technical Field

The present invention generally relates to pneumatic tires and devices for monitoring the conditions of the tires. More particularly, the present invention is related to a monitor assembly housed in a protective body that is placed in a tire and is free to move about while the tire is in use with nothing connecting the monitor assembly to the tire or tire rim. Specifically, the present invention relates to the configuration of the protective body that surrounds the monitoring device.

2. Background Information

Monitoring conditions of pneumatic tires while they are installed and in use on a particular vehicle is desired in the art. The users of this technology particularly desire to measure the internal temperature and internal pressure of a tire. These measurements are preferably capable of being taken while the tire is in use without having to remove the tire from the vehicle or otherwise interrupt the use of the vehicle to take the measurements. It is particularly desirable to monitor the conditions and statistics of large off-the-road truck tires because the off-the-road tires are expensive and subject to harsher conditions than typical passenger car tires. The off-the-road tires on large trucks and other vehicles must be regularly maintained to maximize vehicle and tire efficiency.

Numerous types of monitoring devices are known in the art. One type of known monitoring device uses a passive integrative circuit embedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active, self-powered programmable electronic devices are disclosed in U.S. Pat. Nos. 5,500,065, 5,573,610, 5,562,787, and 5,573,611 which are assigned to the Assignee of the present application.

One problem common to each of these monitoring devices is the problem of attaching the monitoring device to the tire with a stable and lasting attachment. The attachment problem is difficult when the monitoring device is attached to the inside of the tire, the outside of the tire, or embedded within the body of the tire. The mounting configuration must maintain the integrity of the tire. Mounting the device to the rim also creates problems. The rim may be damaged, tool must be created, and the mounting configuration must prevent air from leaking from the tire. Each of these locations creates different problems with the attachment process as well as the manufacturing process of the tire. It is generally undesirable to provide an attachment configuration that requires re-tooling or any re-directing of the existing tire manufacturing lines. It is thus desired in the art to provide a monitoring device for a pneumatic tire that obviates the attachment problems inherent with the prior art monitoring devices.

The prior art attachment problems exist because the forces on an electronic monitoring device while connected to a pneumatic tire are significant and numerous. The forces in the footprint area of the tire must be considered when mounting a monitoring device. Tires are subject to rotational forces when the vehicle is moving and also to various impact forces when the tire contacts bumps or surface irregularities. The attachment of the monitoring device to the tire must be strong enough and secure enough to maintain the position of the monitoring device with respect to the tire while experiencing all of these forces while also protecting the monitoring device from damage resulting from these forces. These concerns have lead to the encapsulation of the monitoring devices and numerous methods of attaching the monitoring device to the internal wall of a tire.

The attachment of the monitoring device to the internal wall of the tire requires the tire to be balanced about its rotational axis prior to use. The monitoring device itself adds weight to the tire and the attachments known in the art add further weight to the tire requiring the tire to be counterbalanced. It is thus desired to provide a monitoring device that may be used with a tire without requiring the tire to be counterbalanced.

Another significant problem experienced with attaching a monitoring device to a pneumatic tire is that the surface of the tire where the monitoring device is typically anchored is not stable. Tires are designed to flex and stretch to accommodate various pressures and forces. The attachment of the monitoring device to the tire must accommodate the movement and stretching of the tire surface where the monitoring device is connected. Such accommodation must last throughout the life of the tire and function at a wide range of temperatures and pressures. It is thus desired in the art to provide a monitoring device that may be used with a pneumatic tire without being connected to one of the tire surfaces that flexes and stretches.

Another problem in the art is that off-the-road tires typically have water or another liquid in the bottom of the tire. One type of liquid typically placed in tires is a sealant sold under the Federally Registered Trademark Tire Life by Fuller Bros., Inc. of Portland Oreg. The monitoring device of the invention must be able to operate in a wet environment. Monitoring devices submerged in a liquid will likely have impaired transmission performance and data may be lost because of the position of the device in the tire.

SUMMARY OF THE INVENTION

In view of the foregoing, it is an objective of the present invention to provide a monitoring assembly for a pneumatic tire that may be monitored from the outside of the tire while the tire is mounted on a tire rim and while the vehicle is in use. The invention provides a monitoring assembly for a pneumatic tire that is placed within the tire but is not connected to the tire or tire rim allowing the monitoring device to move about freely inside the tire.

The invention provides one embodiment of the a protective body configuration that improves the temperature response of the monitoring device with openings defined by the protective body.

The invention provides another embodiment wherein the protective body is fabricated from a rigid material that defines the curved outer surface of the monitoring assembly.

The invention provides a further embodiment wherein a cushion layer surrounds an encapsulated monitoring device with the material of the cushion layer defining a smooth outer surface substantially impervious to liquid.

BRIEF DESCRIPTION OF THE DRAWINGS

Similar numbers refer to similar elements throughout the specification.

DESCRIPTION OF THE PREFERRED EMBODIMENTS

The monitoring assembly of the present invention is indicated generally by the numeral 10 in the accompanying drawings. Monitoring assembly 10 generally includes a radio frequency, active, electronic monitoring device 12 surrounded by a protective body 14. Device 12 may be of the type shown in U.S. Pat. No. 5,500,065, the contents of which are incorporated herein by reference, or could be of other configurations and operations without effecting the concepts of the present invention. Assembly 10 is used simply by placing it inside a tire 16 such that assembly 10 is trapped between tire 16 and the rim 18 on which the tire is mounted. Assembly 10 is free to move about a pressurized air chamber 20 formed between tire 16 and rim 18 with only the body of tire 16 and rim 18 stopping or limiting the movement of assembly 10.

In accordance with one of the objectives of the present invention, assembly 10 may be simply placed in tire 16 before the tire is mounted on rim 18. This method of combining assembly 10 with tire 16 allows the assembly to be used with existing tires, allows assembly 10 to be used with different tires, and does not require the tire manufacturing line to be reconfigured to add assembly 10 to a specific tire.

Figure 1:
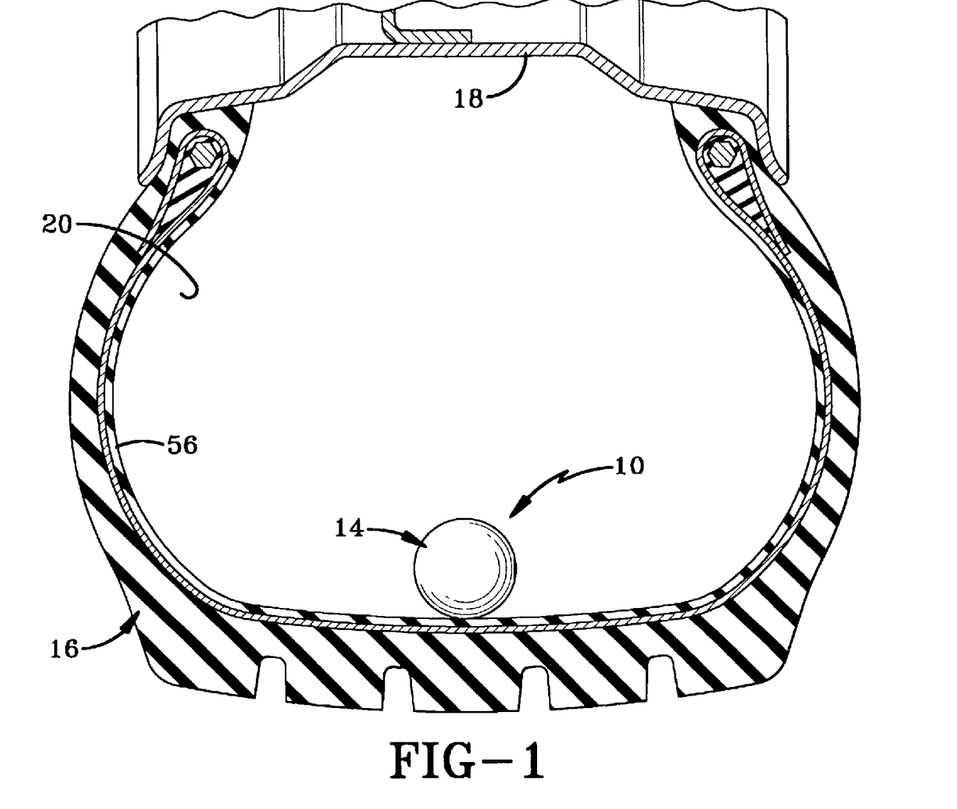
FIG. 1 is a sectional view of a pneumatic tire mounted on a rim having the monitoring device assembly of the present invention located in the chamber between the tire body and the rim.
Figure 2:
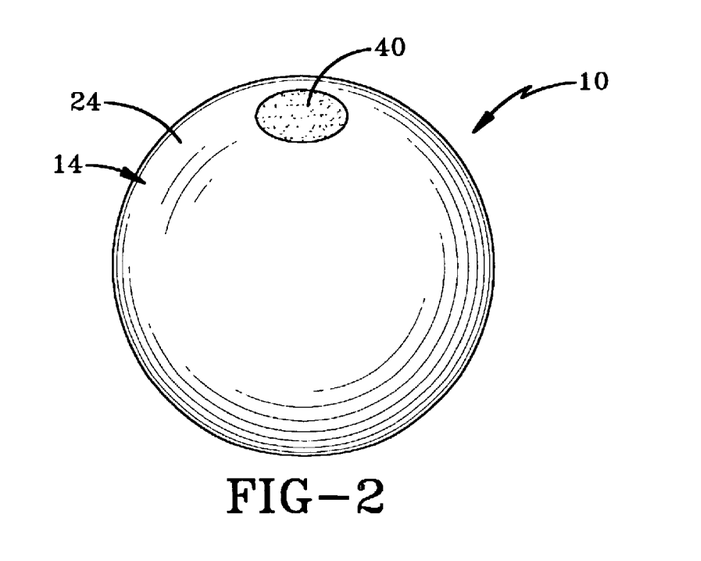
FIG. 2 is an enlarged perspective view of the monitoring device assembly of FIG. 1 removed from within the tire.

The use of assembly 10 may be particularly useful in large off-the-road tires that do not rotate at a high rate of speed but could also be used in truck and passenger tires if desired. Off-the-road tires are typically large and have relatively thick side walls. Monitoring assembly 10 will rest at the bottom of tire 16 as shown in FIG. 1 when tire 16 is rotating slowly about its rotational axis. Monitoring assembly 10 may rock back and forth as tire 16 rotates and experiences bumps but will not spin about the rotational axis of tire 16 at lower speeds. In these situations, monitoring assembly 10 would not experience significant impact or shock forces that would tend to damage electronic active monitoring device 12. When tire 16 rotates faster, there may be sufficient friction and forces between protective body 14 and tire 16 to cause monitoring assembly 10 to rotate about the rotational axis of tire 16 as if it was fixed to the inner surface of the tire. Protective body 14 is formed in a shape, such as the substantially spherical shape depicted in the drawings, that allows assembly 10 to roll about the interior of tire 16. Protective body 14 is shaped to prevent the movement of monitoring assembly 10 about the interior of tire 16 from causing additional forces to be exerted on electronic monitoring device 12 and to tire 16. For instance, protective body 14 may be formed in any of the shapes depicted in FIGS. 7A–7D.

Figures 3, 4:
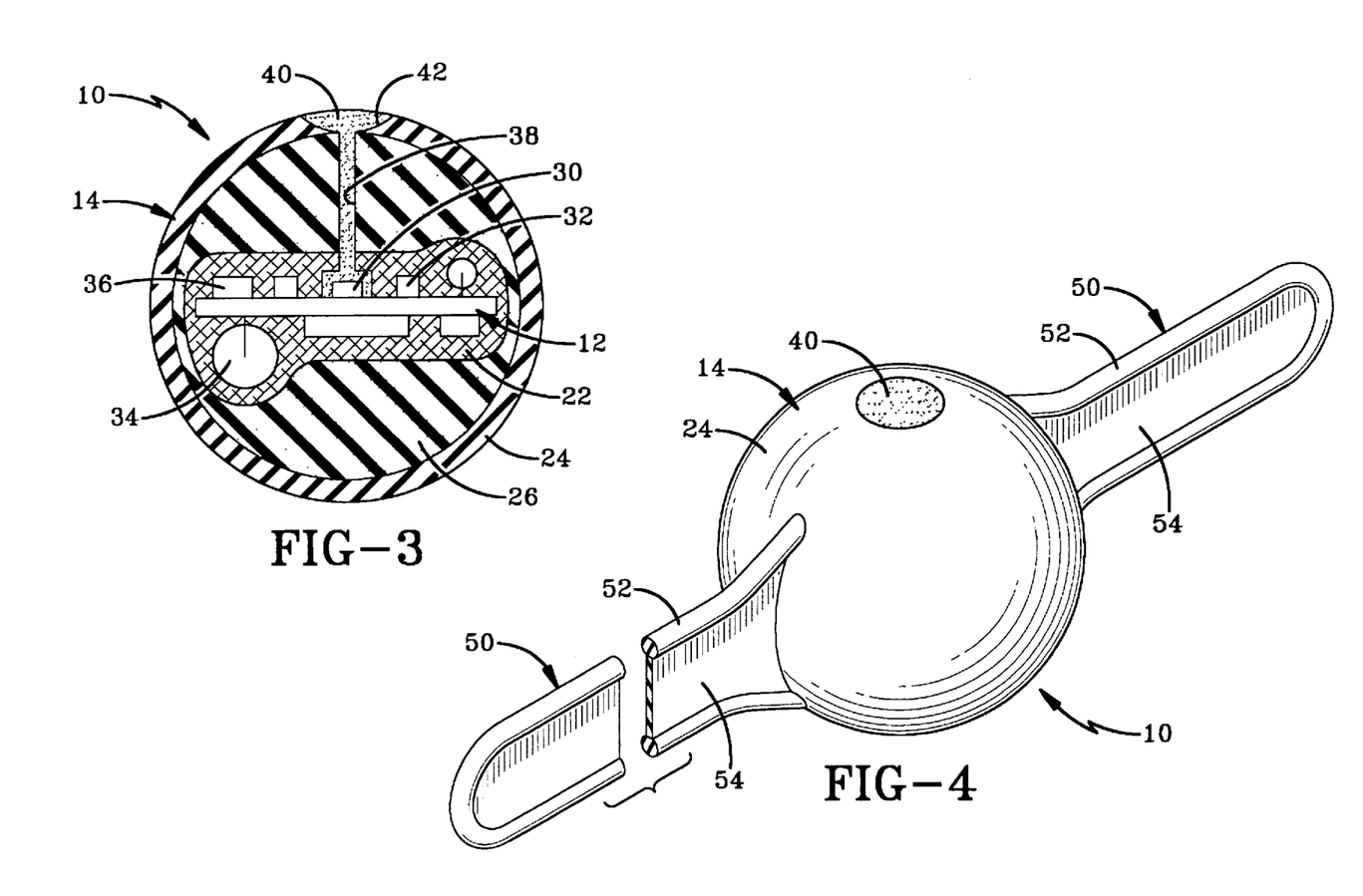
FIG. 3 is a sectional view of the monitoring device of FIG. 2, the sectional view taken through a portion of the monitoring device assembly including the breathing tube.
FIG. 4 is a perspective view, portions of which are broken away and in section, of a modified embodiment of the monitoring device of FIG. 2.

In accordance with another objective of the present invention, protective body 14 includes an encapsulation layer 22, an outer skin 24, and a cushion 26 disposed between skin 24 and encapsulation layer 22 as shown in FIG. 3. Encapsulation layer 22 may be formed from a substantially rigid encapsulation material such as a hard plastic, epoxy, or rubber. Encapsulation layer 22 is configured to maintain the position of each of the elements of electronic monitoring device 12 when monitoring assembly 10 is loosely moving about chamber 20 while tire 16 is in use. Cushion 26 preferably is fabricated from a foam or a soft rubber and provides a shock absorber to assembly 10. The foam is preferably resilient. As can be seen in FIG. 3, the thickness of cushion 26 varies so that the internal surface of cushion 26 matches the exterior surface of encapsulation layer 22, while the external surface of cushion 26 is substantially spherical. Skin 24 provides a durable, protective layer to monitoring assembly 10 and may be fabricated from a substantially durable rubber or plastic that is fixed to cushion 26 by a suitable adhesive or by curing the materials together. In one embodiment of the present invention, skin 24 has an external diameter of about 2 inches to about 2½ inches. Obviously, other sizes of assembly 10 are contemplated by the present invention.

Electronic monitoring device 12 preferably is an active monitoring device that includes at least one sensor such as a pressure sensor 30. Other sensors may include a thermometer 32 for measuring the internal temperature of tire 16. Electronic monitoring device 12 may further include a battery 34 that powers a central processing unit (CPU) 36 that both drives and monitors the other sensors of device 12. Numerous types of electronic monitoring devices are known in the art and the specific configuration described is not to limit the application of the present invention.

Pressure sensor 30 must be exposed to the pressure of the surrounding atmosphere in chamber 20 for it to provide useful information. A breathing tube 38 thus is provided through encapsulation layer 22, cushion 26, and skin 24. Breathing tube 38 preferably is formed during the fabrication of monitoring assembly 10 or may be formed after assembly 10 has been fabricated. Breathing tube 38 may be empty to provide direct fluid communication between pressure sensor 30 and the surrounding atmosphere. In another embodiment of the present invention, breathing tube 38 is filled with a transfer gel 40 that has a one-to-one transfer ratio so that pressure sensor 30 senses the pressure change in transfer gel 40 which, in turn, senses and experiences pressure changes in the atmosphere of chamber 20 that surrounds monitoring assembly 10. Transfer gel 40 prevents breathing tube 38 from being clogged with debris such as dust, rubber shavings, or grease that may be present in chamber 30 or on rim 18. An indentation 42 is provided in skin 24 to give transfer gel 40 more surface area that is exposed to the atmosphere surrounding monitoring assembly 10. In another embodiment of the invention, a flexible diaphragm 44 (FIG. 9) covers breathing tube 38 to prevent transfer gel 40 from becoming contaminated.

Figure 5:
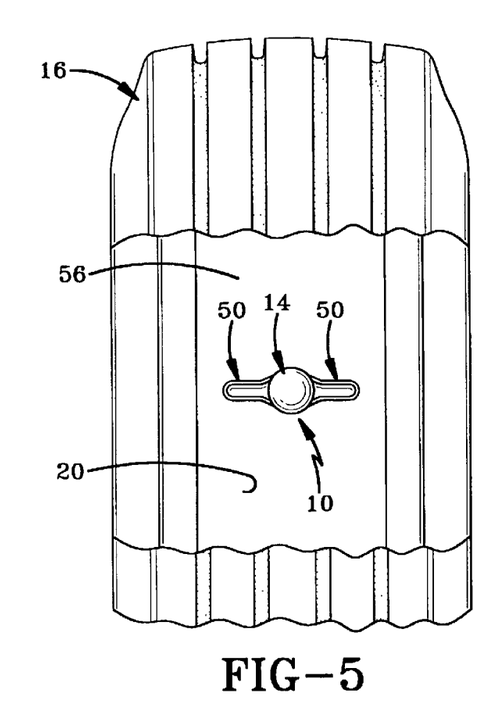
FIG. 5 is a diagrammatic plan view with portions broken away showing the modified monitoring device assembly of FIG. 4 located in a pneumatic tire with the rim removed.
Figure 6:
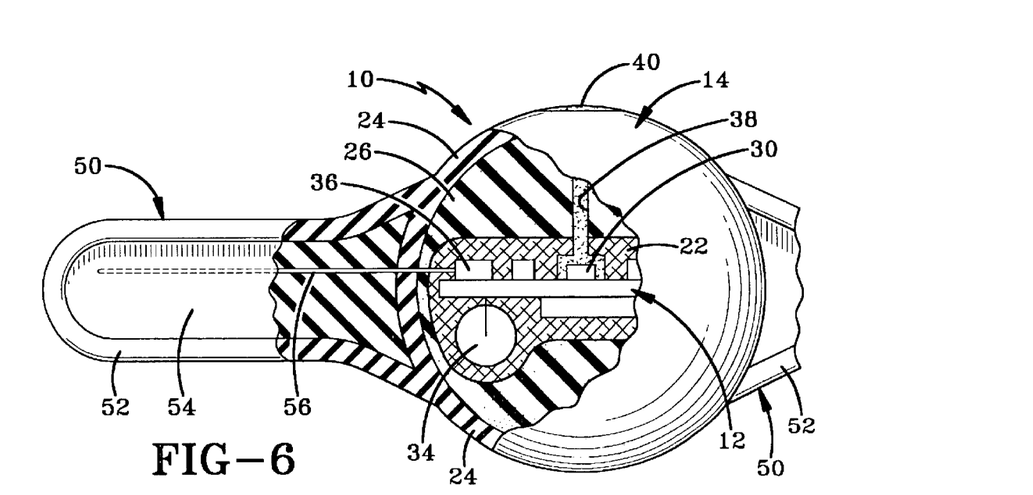
FIG. 6 is a fragmentary view with portions broken away and in section of a further modified monitoring device assembly from that of FIG. 4.
Figure 7A:
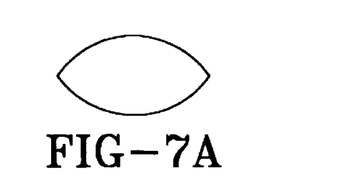
FIGS. 7A–7D schematically depict alternative protective body shapes for the monitoring assembly of the present invention.
Figure 7B:
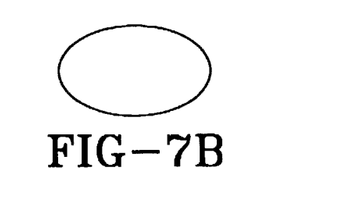
Figure 7C:
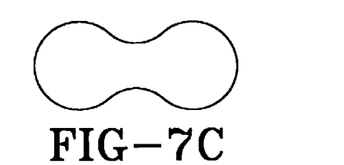
Figure 7D:
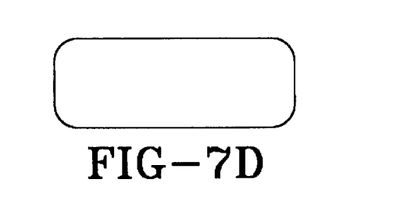

In accordance with another objective of the present invention, monitoring assembly 10 may be provided with a pair of wings 50 that extend from substantially opposite sides of protective body 14 as shown in FIG. 4. Wings 50 help maintain the alignment of assembly 10 in tire 16 when the tire is in use. The proper alignment of assembly 10 within the tire provides a strong reliable signal between electronic monitoring device 12 and a data gathering machine (not shown) positioned outside of tire 16. In one embodiment of the present invention, each wing 50 is formed from the same material as skin 24 and includes a circumferential stiffening rib 52 and an intervening webbing 54. Wings 50 may also be fabricated from a material that is substantially the same or the same as the material of an innerliner 56 of tire 16. In still other embodiments of the present invention, wings 50 may be reinforced with rigid plastic member or other types of reinforcements. As discussed above, wings 50 help maintain the alignment of monitoring assembly 10 within tire 16 in order to provide a more efficient transmission signal therefrom. As shown in FIG. 5, wings 50 will help align monitoring assembly 10 such that each wing 50 extends in a direct substantially parallel to the rotational axis of tire 16.

Figures 8, 9:
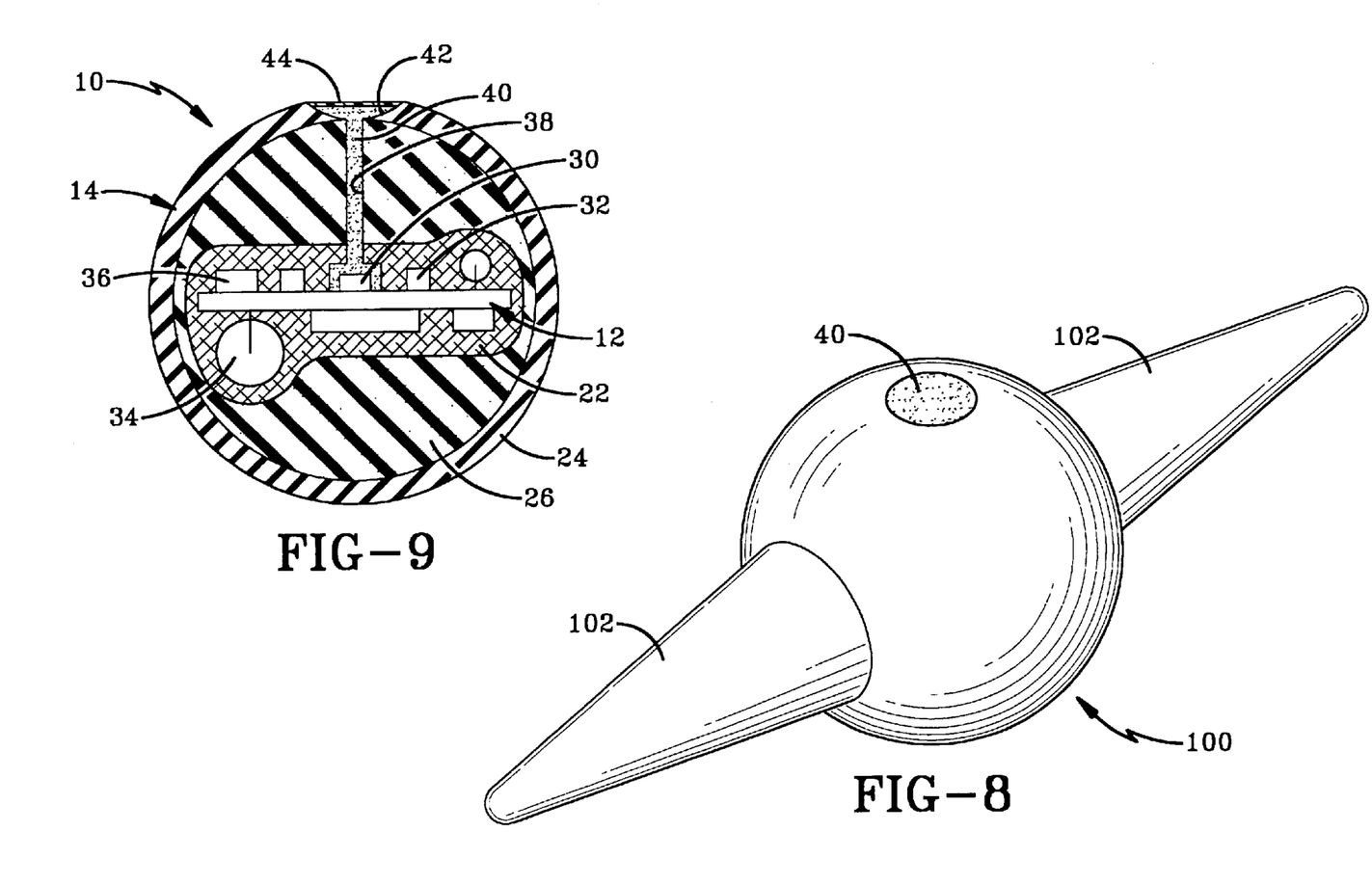
FIG. 8 is a perspective view of a modified embodiment of the monitoring device of FIG. 2.
FIG. 9 is a view similar to FIG. 3 showing an alternative embodiment of the breathing tube configuration.

In accordance with another objective of the present invention, an antenna 56 may extend from CPU 36 or another location of electronic monitoring device 12 through encapsulation layer 22, through cushion 26, through skin 24, and into wing 50. The extension of antenna 56 into wing 50 allows it to more easily communicate with a data gathering device (again not shown) outside of tire 16 and allows antenna 56 to be ideally configured to transfer strong signals. In addition, the placement of antenna 56 in wing 50 allows the configuration and alignment of antenna 56 to be predictable so that the corresponding antenna on the data gathering device may be ideally aligned to communicate with antenna 56. Another embodiment of the invention is depicted in FIG. 8 with monitoring assembly 100 having a pair of wings 102 that are conically-shaped.

Figure 10:
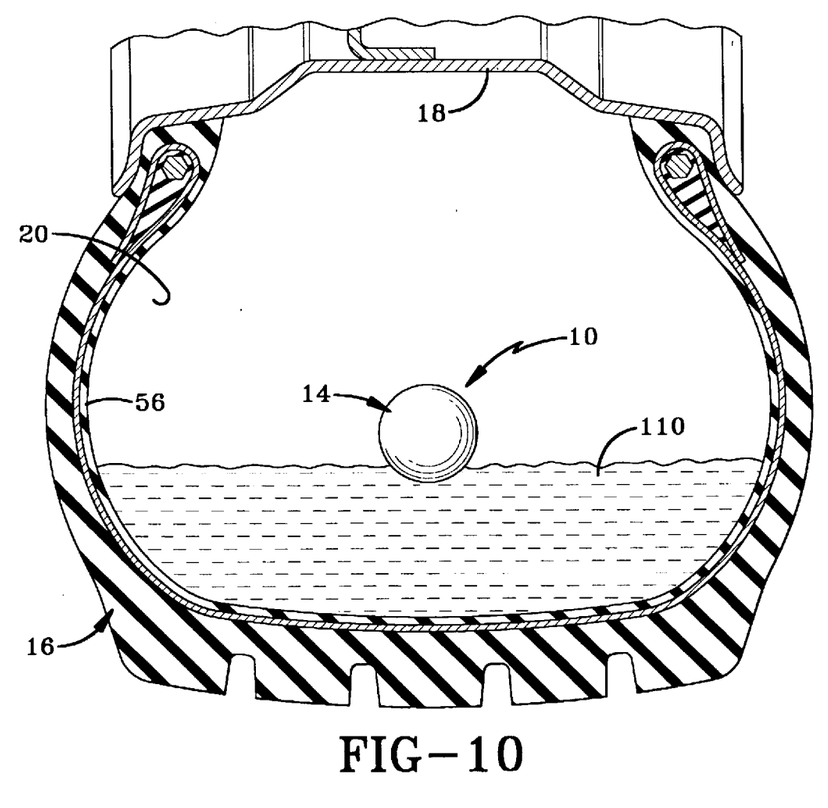
FIG. 10 is a view similar to FIG. 1 showing the monitoring assembly floating in liquid disposed within the tire.

In accordance with other objectives and advantages of the invention, monitoring assembly 10 is configured to be liquid-tight and float (FIG. 10) on a variety of liquids 110 such as water, Tire Life®, or other liquids. Most liquids 110 disposed within tire 16 will have a specific gravity of 1 or higher. As such, the specific gravity of assembly 10 must be less than 1 in these embodiments. Assembly 10 may be configured to float by fabricating protective body 14 entirely from materials that float or by trapping a sufficient amount of air within protective body 14 to cause assembly 10 to float.

In accordance with another objective of the invention, protective body 14 is fluid-tight to prevent fluid from entering protective body 14 when assembly 10 is floating in liquid.

Assembly 10 has a longer life when it floats on the upper surface of liquid 110 and the transmissions to and from tire 16 are improved when assembly 10 is not surrounded by liquid 110. Wings 50 or 102 also function in liquid 110 to consistently position assembly 10 within tire 16.

Figure 11:
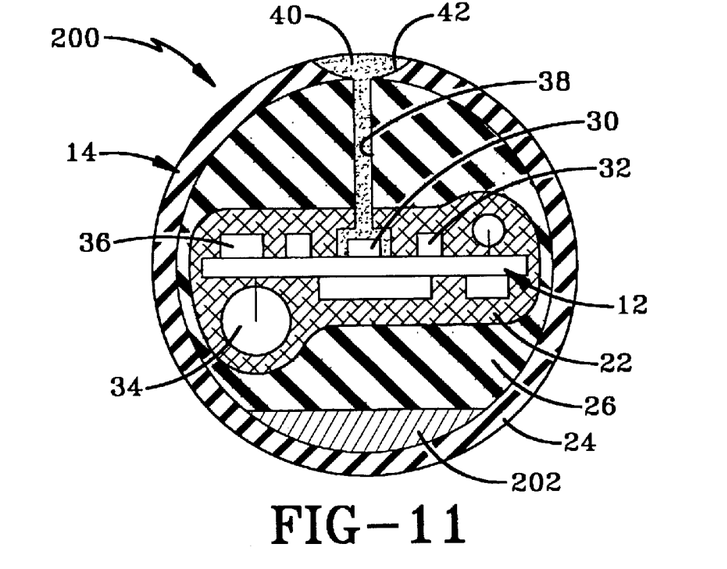
FIG. 11 is a view similar to FIG. 3 showing an alternate embodiment of the monitoring device.
Figure 15:
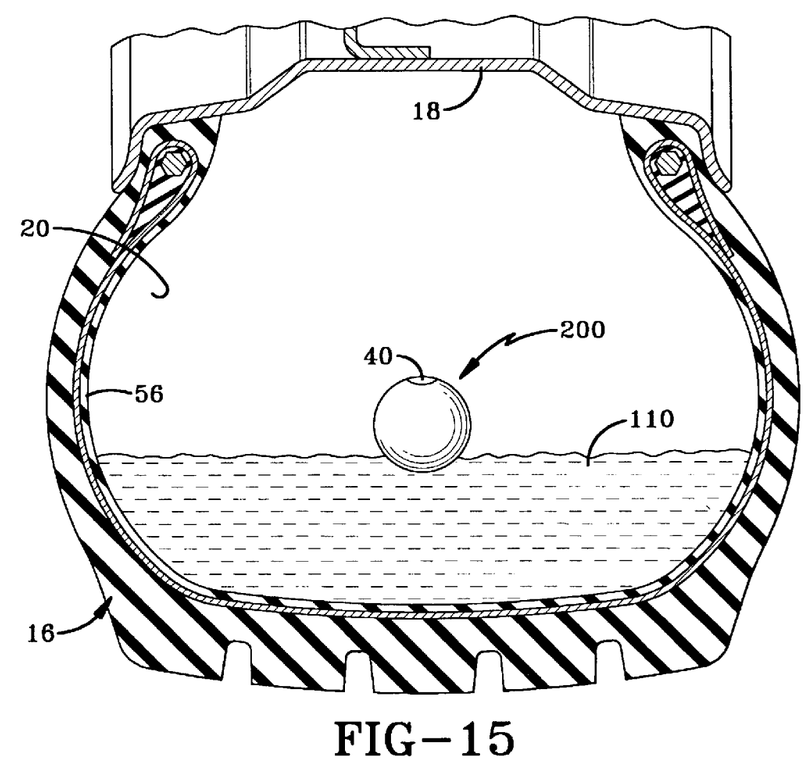
FIG. 15 is a view similar to FIG. 10 showing the monitoring device of FIG. 11 or 13 floating in liquid inside a tire.

FIG. 11 depicts an alternative embodiment of the monitoring assembly of the invention. The alternative version depicted in FIG. 11 is indicated generally by the numeral 200. Monitoring assembly 200 may be similar to monitoring assembly 10 and similar elements are depicted in FIG. 11 in order to provide one possible example of the invention. Monitoring assembly 200 includes tube 38 that allows pressure sensor 30 to function. In environments such as that liquid-filled tire of FIG. 15, it may be important to keep the opening of tube 38 above liquid 110. In order to achieve this objective, monitoring assembly 200 includes a weight 202 disposed in a manner with respect to the opening of tube 38 so that assembly 200 will naturally return to a predictable position. In one embodiment, the weight is disposed opposite the opening so that the opening of tube 38 will be in the upright orientation depicted in FIG. 15 when floating in liquid 110. In a configuration where monitoring assembly 200 will mostly be used in a liquid, the body of the monitoring assembly does not necessarily have to be curved. When monitoring assembly 200 is designed to float in liquids, the outer configuration of the body may be a cube because the body will have little contact with the inner surface of the tire.

Figure 12:
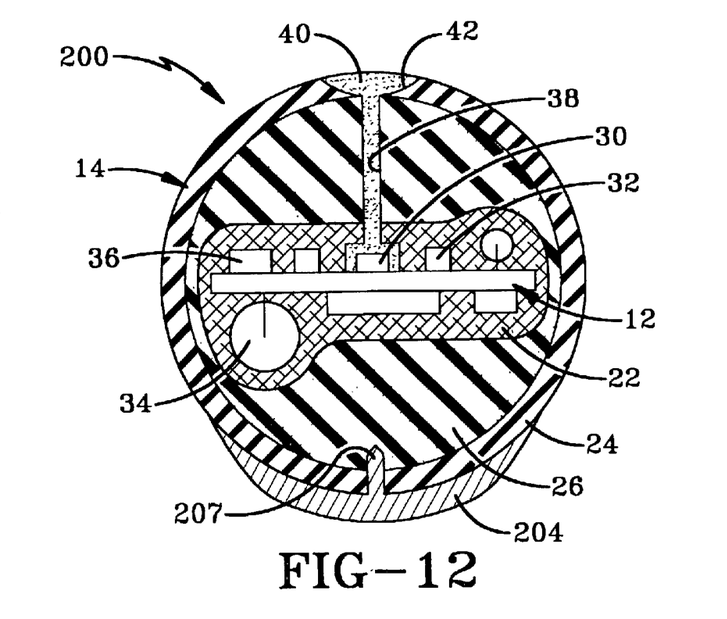
FIG. 12 is a view similar to FIG. 3 showing an alternate embodiment of the monitoring device.
Figure 14:
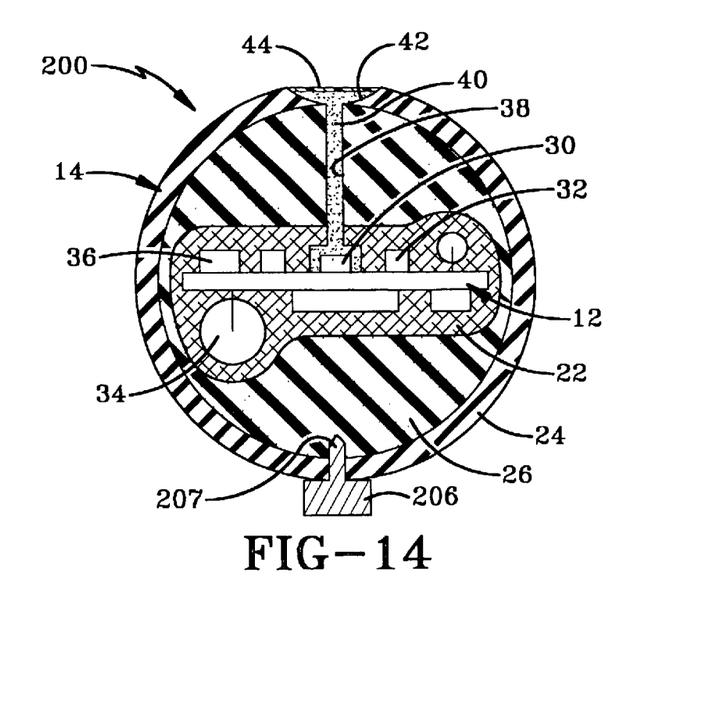
FIG. 14 is a view similar to FIG. 9 showing an alternate embodiment of the monitoring device.

Weight 202 may be formed in a variety of different configurations such as the internal weight of FIG. 11, the smoothly-curved external weight 204 of FIG. 12, or the external weight 206 of FIG. 14. When the weight is disposed on the outside of the monitoring assembly, a connector 207 may be used to hold the two together.

Weight 202 may be made from a dense material such as lead, another type of metal, a dense ceramic, a heavy liquid, a pocket of small beads, or a dense plastic material. Any of a variety of materials and items may be used to ballast the monitoring assembly to keep the opening of tube 38 in an upright configuration.

Figure 13:
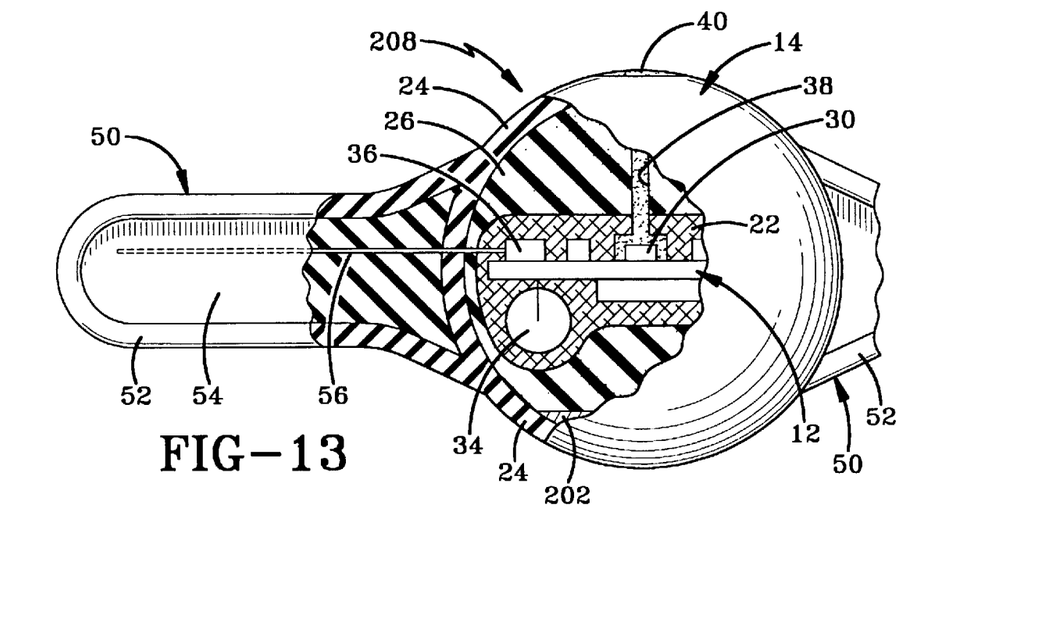
FIG. 13 is a view similar to FIG. 6 showing an alternate embodiment of the monitoring device.

Weight 202 may also be added to a winged monitoring assembly 208 as shown in FIG. 13. In this embodiment, weight 202 and wings 50 cooperate to maintain the position of assembly 208 in liquid 110. Wings 50 may be substantially horizontal when assembly 208 is floating in liquid.

Figure 16:
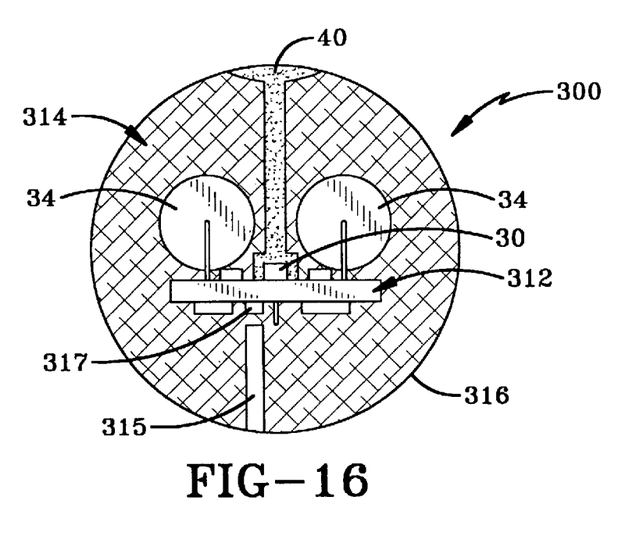
FIG. 16 is a section view of an alternative protective body with one channel designed to speed the temperature response of the monitoring device disposed within the monitoring assembly.
Figure 17:
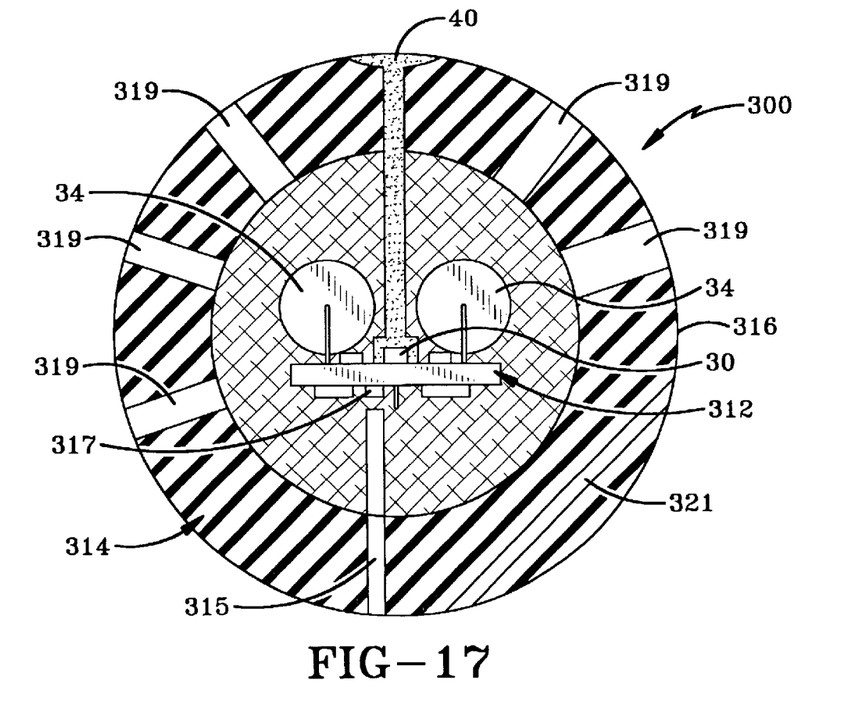
FIG. 17 is a section view of an alternative protective body with different types of channels designed to speed the temperature response of the monitoring device disposed within the monitoring assembly.

An alternative embodiment of the monitoring assembly of the present invention is indicated generally by the numeral 300 in FIGS. 16 and 17. Monitoring assembly 300 generally includes an active monitoring device 312 surrounded by a protective body 314. Monitoring device 312 may be any of a variety of devices known in the art such as the ones described above. Device 312 may be configured to monitor the temperature and/or pressure of the atmosphere immediately surrounding protective body 314. One potential use of assembly 300 is for monitoring pneumatic tires 16 by placing assembly 300 loosely in tire 16 between tire 16 and rim 18 as described above. In this configuration, assembly 300 is free to move about chamber 20 that is formed between tire 16 and rim 18 with only the body of tire 16 and rim 18 stopping or limiting the movement of assembly 300.

In accordance with this embodiment of the invention, the temperature response of assembly 300 is improved by providing at least one open channel 315 that extends from the outer surface 316 of protective body 314 to a location inside protective body 314. FIG. 16 depicts an embodiment where in the inner end of open channel 315 is disposed adjacent a temperature sensor 317. A plurality of open channels 315 may be used as desired as long as the function of protective body 314 is not destroyed.

In FIG. 16, protective body 314 includes a single encapsulation layer. The encapsulation material that forms protective body 314 is relatively rigid as described above. In FIG. 16, the encapsulation material forms the only layer of protection for monitoring device 312. As such, the outer surface of the encapsulation material is rounded so that monitoring assembly 300 may move freely within chamber 20. The outer surface of protective body 314 may be formed in any of the configurations of FIGS. 7A, 7B, 7C, or 7D. The inventors also contemplate that the embodiment of FIG. 16 may be used with wings 50, wings 102, weight 202, weight 204, or weight 206. The configuration of FIG. 16 or 17 may also be combined with antenna 56 that extends into wings 50.

Protective body 314 is formed with an inner layer and an outer layer in FIG. 17. The inner layer of protective body 314 is the rigid encapsulation material with the outer layer being a flexible cushioning layer as described above. In this embodiment, open channel 315 may extend from the outer surface of protective body 314 to a location adjacent temperature sensor 317 or open channels 319 may extend from the outer surface of protective body 314 to the outer surface of the inner layer of protective body 314. An open channel 321 may also extend through protective body 314 from a location at the outer surface of protective body 314 to a separate, spaced location at the surface of protective body 314.

Open channels 315, 319, and 321 help overcome the insulating properties of protective body 314 to improve and speed the temperature measurement response time of monitoring device 312. Channels 315, 319, and 321 may be used in a liquid 110 such as those described above.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. An improved monitoring assembly having a monitoring device adapted to measure temperature; the monitoring device surrounded by a protective body having an outer surface; the improvement comprising: at least one open channel extending from the outer surface of the protective body to a location inside the protective body; and the open channel extending from a first location at the outer surface of the protective body to a second location at the outer surface of the protective body; the first and second locations being spaced apart.

2. An improved monitoring assembly having a monitoring device adapted to measure temperature; the monitoring device surrounded by a protective body having an outer surface; the improvement comprising: at least one open channel extending from the outer surface of the protective body to a location inside the protective body; the open channel having an inner end disposed inside the protective body; the inner end of the open channel being spaced from monitoring device by a portion of the protective body.

3. The improvement of claim 2, wherein the protective body includes an inner layer and an outer layer; the open channel extending from the outer layer to the inner layer.

4. The improvement of claim 3, wherein a plurality of open channels are defined by the protective body.

5. The improvement of claim 2, wherein the protective body includes an inner layer and an outer layer; the open channel extending from the outer layer into the inner layer.

6. The improvement of claim 5, wherein the monitoring device includes a temperature measurement device; the open channel extending to a location adjacent the temperature measurement device.

7. A monitoring assembly in combination with a pneumatic tire; the combination comprising:
a rim;
a tire mounted to the rim and defining a chamber between the tire and rim;
a monitoring assembly loosely disposed in the chamber;
the monitoring assembly including a monitoring device and a protective body surrounding the monitoring device;
the protective body having an outer surface; and
the protective body defining at least one open channel extending into the protective body from the outer surface.

8. The monitoring assembly of claim 7, wherein the protective body is substantially spherical.

9. The monitoring assembly of claim 7, further comprising a pair of wings extending outwardly from the protective body.

10. The monitoring assembly of claim 7, wherein the protective body defines a plurality of channels extending into the protective body from the outer surface.

11. The monitoring assembly of claim 10, wherein at least one of the channels extends from the outer surface through the protective body to the outer surface.

12. The monitoring assembly of claim 7, wherein the protective body includes an inner protective layer and an outer protective layer; the channel extending through the outer protective layer to the inner protective layer.

13. The monitoring assembly of claim 12, wherein the outer protective layer has an outer surface; the outer protective layer defining a channel that extends from the outer surface through the outer protective layer to the outer surface.

14. The monitoring assembly of claim 12, wherein the inner protective layer is fabricated from a rigid encapsulation material.

15. The monitoring assembly of claim 14, wherein the outer protective layer is softer than the inner protective layer.

16. The monitoring assembly of claim 7, wherein the monitoring assembly is adapted to float on water.

17. The monitoring assembly of claim 16, further comprising a weight connected to the monitoring assembly; the weight adapted to orient the monitoring assembly in the liquid in a predictable orientation.

18. The monitoring assembly of claim 17, wherein the protective body defines a tube that provides communication between the monitoring device and the atmosphere surrounding the protective body; the tube having an opening where the tube exits the protective body.

19. The monitoring assembly of claim 18, wherein the weight is disposed substantially opposite from the tube opening.

* * * * *